(No Model.)

E. W. CLARK.
FISHING BUOY.

No. 360,418. Patented Apr. 5, 1887.

Witnesses.
W. A. Tracy
William T. Speer

Inventor:
Emi. W. Clark

UNITED STATES PATENT OFFICE.

EMRI W. CLARK, OF NASHUA, NEW HAMPSHIRE.

FISHING-BUOY.

SPECIFICATION forming part of Letters Patent No. 360,418, dated April 5, 1887.

Application filed December 6, 1886. Serial No. 220,855. (No model.)

*To all whom it may concern:*

Be it known that I, EMRI W. CLARK, a citizen of the United States, residing at Nashua, in the county of Hillsborough, and State of New Hampshire, have invented a new and useful Fishing-Buoy, of which the following is a specification.

My invention relates to the class of devices intended for the assistance of fishermen when engaged in fishing; and it consists of a buoy or float which is attached to a fishing-line in such a way as to support a hook at any desired depth until the fish has taken the bait, when the buoy is detached from fixed connection with the line, and becomes through its sliding connection a marking-buoy, showing the position of the line at the water-surface. I further improve the buoy by making the catch at its upper end and the ring at its lower end of one piece of metal, which makes it impossible to lose the buoy through the shrinking of its wooden part. I attain these objects by the mechanism illustrated in the accompanying drawings, in which—

Figure 1:
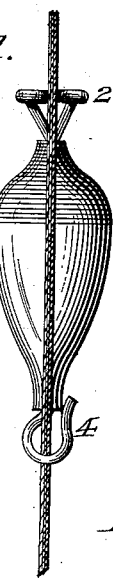
Figure 2:
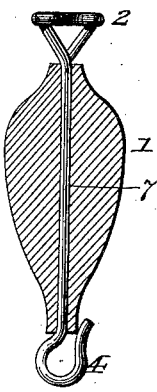
Figure 3:
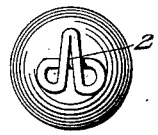
Figure 5:
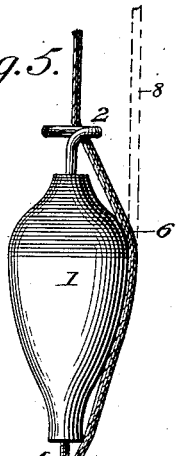
Figure 4:
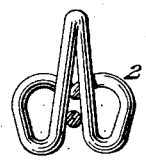
Figure 6:
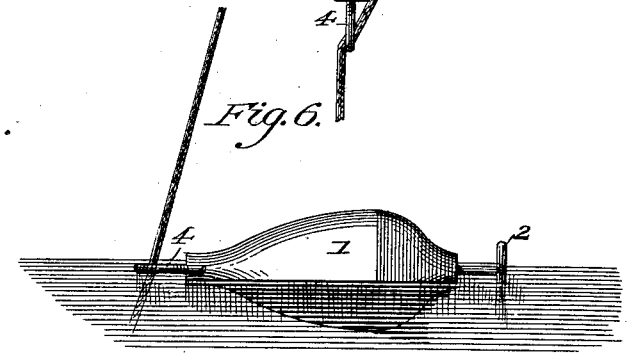

Figure 1 represents the buoy as placed upon the line. Fig. 2 is a section of Fig. 1. Fig. 3 is a plan view of Fig. 1. Fig. 4 is an enlarged plan view of the catch. Fig. 5 is a side view of Fig. 1 in outline, showing the position of the line when ready for use. Fig. 6 is a view of the buoy when uncaught from the line and is acting as a marking-buoy.

Similar numbers of reference refer to similar parts.

1 represents the body of the buoy. This is of the ordinary kind familiar to all fishermen. At its upper end I place the catch 2. This catch is shown in various positions in each of the figures, and is connected with the buoy as shown best in Fig. 2. It may be made of good stiff wire bent into the form shown in the drawings, or may be cut from sheet metal. Its working part consists of the V-shaped gripper, into which the line is forced at the point where the buoy is to be secured.

In practice it will be found that a slight or firmer hold of the gripper will be desirable, and this is easily secured by forcing the line more or less tightly into the V of the gripper.

Extending from the bottom of the buoy is the ring 4, preferably made with a spring, as shown, so that the buoy may be quickly attached to or detached from the line. The line passes freely through this ring, and all connection of the buoy with the line, for the prevention of its sliding, is through the gripper.

In Fig. 2, at 7, I show how the catch 2 and the ring 4 are made of one piece, making it impossible for the buoy to become detached from these connections.

At 6, Fig. 5, is shown the bulge of the buoy, which prevents the line from taking a straight course from the ring to the catch and presents the part of the line between the buoy and the catch at an angle from the center line of the buoy.

Fig. 5 also shows the position of the buoy upon the line when ready for use, making it evident that if force is applied to the line it will tend to draw it out of the gripper and bring it to the position shown by the dotted line 8.

To use my buoy, the fisherman first springs the line into the ring 4, and having determined to what depth he wishes his hook to hang he connects the buoy to the line by forcing the line into the gripper at the desired point with such tension as in his judgment he deems best. Having cast his line, the buoy will support the hook until the fish has taken the bait and the line is drawn upon by the fisherman, when it will be released from the gripper, the buoy remaining attached to the line at its point of contact with the water, the line sliding freely through the ring, making an excellent marking-buoy, showing the location of the line.

What I claim, and desire to secure by Letters Patent, is—

1. The combination of the float with a combined gripper and loop, the shank or body of which passes centrally through the float, substantially as described.

2. A line-float the central portion of which bulges so as to bring the line out of a straight course between the gripper and the loop, and which is adapted to sustain the weight of the fish-hook and the bait, having at the upper end the V-shaped gripper, into which the line is forced at a desired tension, and at its lower end a loop which may slide freely on the line, making first a sustaining and second a marking float, essentially as described.

EMRI W. CLARK.

Witnesses:
ALONZO G. HUTCHINS,
WILL A. TRACY.